Oct. 27, 1953  N. E. SPIESS, JR., ET AL  2,657,022
BEATER MECHANISM FOR SOFTENING ICE CREAM
Filed April 27, 1951  5 Sheets-Sheet 1
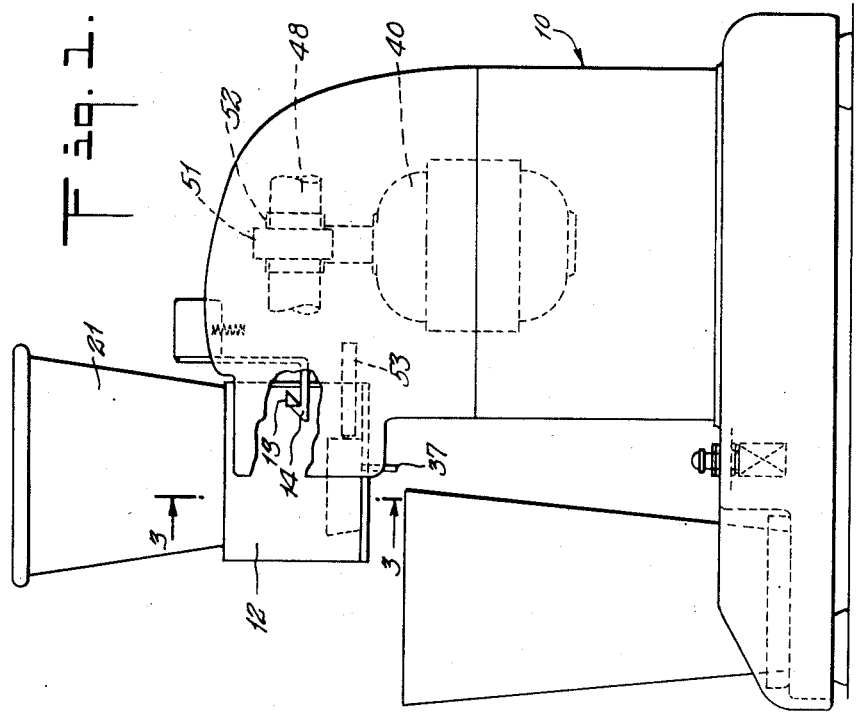
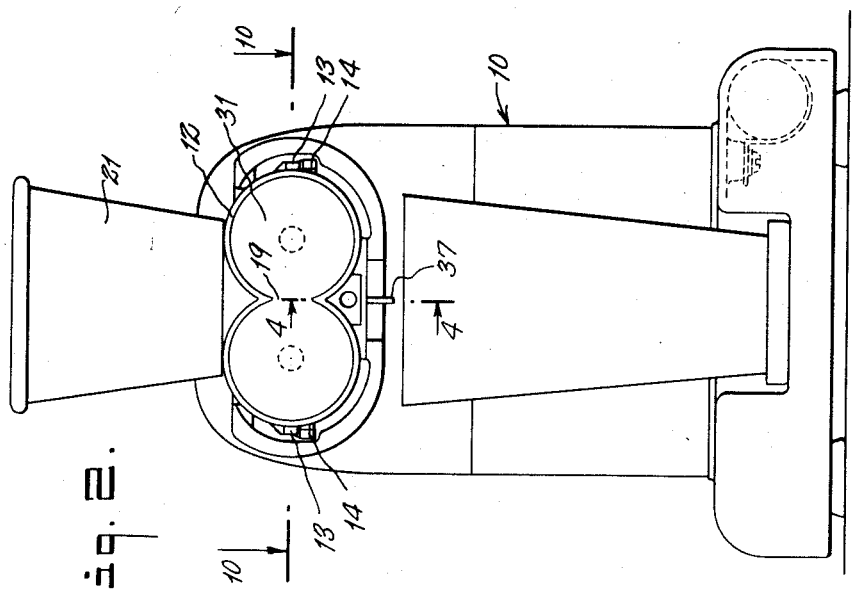
INVENTORS
NEWTON E. SPIESS, JR.,
BY EDWARD M. GROPEN,
KENNETH R. WEAVER
Campbell, Brumbaugh, Free & Graves
THEIR ATTORNEYS

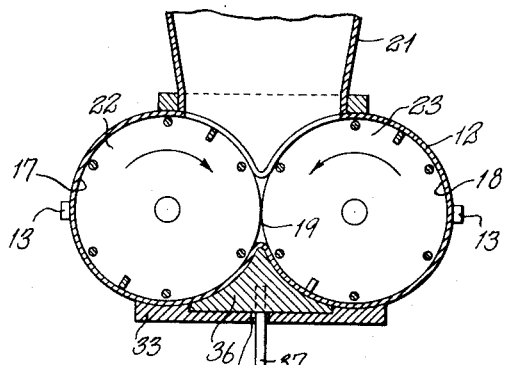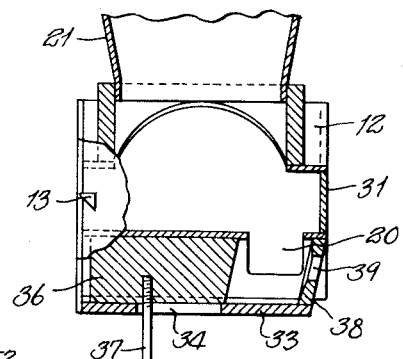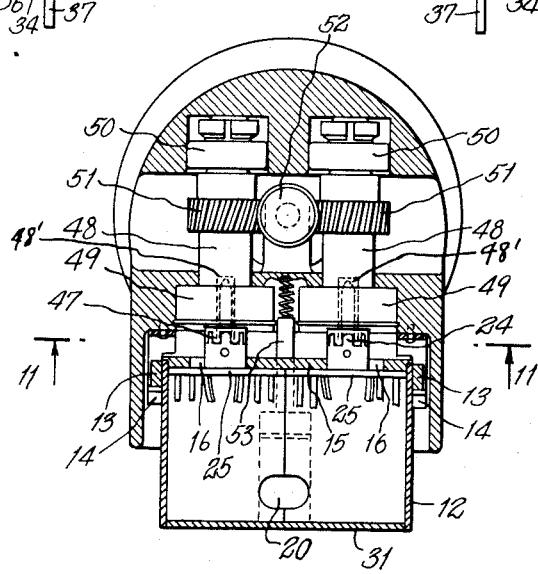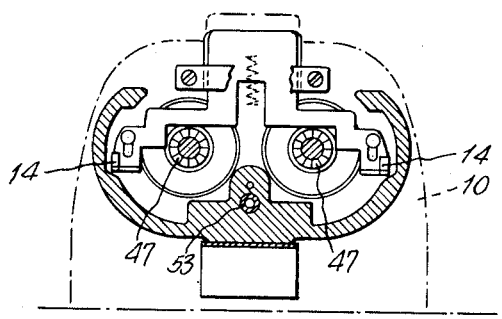

Oct. 27, 1953   N. E. SPIESS, JR., ET AL   2,657,022
BEATER MECHANISM FOR SOFTENING ICE CREAM
Filed April 27, 1951   5 Sheets-Sheet 3
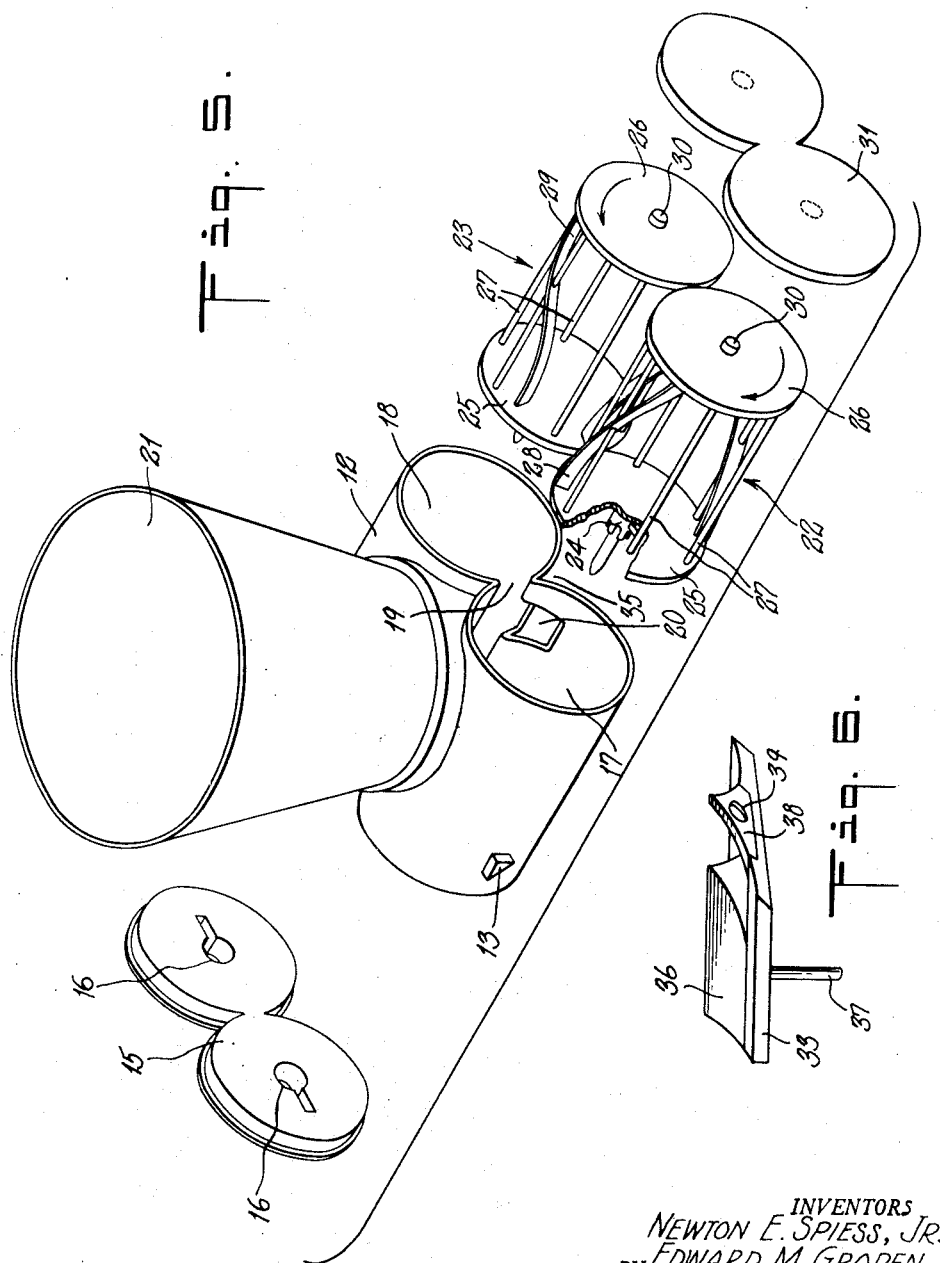
INVENTORS
NEWTON E. SPIESS, JR.,
BY EDWARD M. GROPEN,
KENNETH R. WEAVER
Campbell, Brumbaugh, Free & Graves
THEIR ATTORNEYS Oct. 27, 1953 N. E. SPIESS, JR., ET AL 2,657,022
BEATER MECHANISM FOR SOFTENING ICE CREAM
Filed April 27, 1951 5 Sheets-Sheet 4

INVENTORS
NEWTON E. SPIESS, JR.,
BY EDWARD M. GROPEN,
KENNETH R. WEAVER
Campbell, Brumbaugh, Free & Graves
THEIR ATTORNEYS Oct. 27, 1953  N. E. SPIESS, JR., ET AL  2,657,022
BEATER MECHANISM FOR SOFTENING ICE CREAM
Filed April 27, 1951  5 Sheets-Sheet 5

INVENTORS
NEWTON E. SPIESS, JR.,
EDWARD M. GROPEN,
KENNETH R. WEAVER
BY Campbell, Brumbaugh, Free & Graves
THEIR ATTORNEYS

UNITED STATES PATENT OFFICE 2,657,022

BEATER MECHANISM FOR SOFTENING ICE CREAM

Newton E. Spiess, Jr., Oakdale, Edward M. Gropen, East Northport, and Kenneth R. Weaver, Bellport, N. Y., assignors to National Dairy Research Laboratories, Inc., Oakdale, N. Y., a corporation of Delaware Application April 27, 1951, Serial No. 223,286

17 Claims. (Cl. 259—6)

The present invention relates to a machine for producing soft ice cream and, more particularly, embodies a machine for such purpose, the structure of which makes the machine available at relatively low cost and for convenient use on counters and the like.

It has long been known that, immediately after freezing, ice cream has a flavor and texture which to many people is more appealing than the corresponding properties of the same product after it has been stored at normal ice cream storage temperatures for some time. Heretofore, freezer-fresh ice cream has been available to consumers only at the point of manufacture of the ice cream, and in view of the relatively great expense of ice cream manufacturing machinery, this soft ice cream has not been available in the vast number of retail outlets where the hard ice cream is sold. Moreover, even if ice cream manufacturing facilities are installed in numerous of these retail locations, the quality of the product frequently has been found to be inferior because of the inability to maintain the desired close conditions of control necessary in the manufacture of a high-grade quality of ice cream.

It has been found that a product similar to freezer-fresh ice cream can be made by whipping conventional ice cream that has been hardened by storage at a relatively low temperature such as —10° to +10° F. for a considerable length of time. Such whipping operation serves to convert the relatively hard product that is normally sold in retail outlets to a product having flavor and texture that is similar to the freezer-fresh type of product, the temperature of the product being elevated to about 20° F., and the air cell and ice crystal structure of which is altered by the whipping operation.

Although various forms of whipping devices have been available, their characteristics have been such as to render them not completely acceptable to the trade either because of the nature of the operation thereof, the difficulty of sterilization, or other structural disadvantages such, for example, as the inability to prevent the contamination of a subsequently whipped batch of ice cream by the residual flavor or characteristic of a previously whipped batch.

In order that a relatively inexpensive and simple, yet effective, whipping mechanism may be provided by means of which soft ice cream may be formed and dispensed, the present invention has been designed, and an object thereof is to provide a machine of the above character having structural characteristics that adapt it for use in the numerous retail outlets where ice cream is sold.

A further object of the invention is to provide a machine of the above character having structural characteristics such that the ice cream may be effectively whipped or softened, and wherein the parts of the machine may be readily sterilized.

In addition, the invention further contemplates a machine of the above character, the structure of which prevents objectionable contamination of one batch of ice cream from a previously whipped batch.

Yet another object of the invention is to provide a machine of the above character wherein means is provided to enable the machine to remain unattended after its operation has been once initiated, the machine automatically shutting itself off after the whipping operation has been completed.

Further objects and advantages of the invention will be apparent as it is described in greater detail in connection with the accompanying drawings, wherein Figure 1 is a view in side elevation showing a whipping machine constructed in accordance with the present invention;

Figure 2 is a view in front elevation showing the machine of Figure 1;

Figure 3 is a partial view in section, enlarged and taken on the plane indicated by the line 3—3 of Figure 1, and looking in the direction of the arrows;

Figure 4 is an enlarged partial view in section, taken on the plane of line 4—4 of Figure 2, and looking in the direction of the arrows;

Figure 5 is an exploded view in perspective showing the whipping mechanism of the machine of Figures 1 to 4;

Figure 6 is a detailed perspective view showing the valve mechanism of the whipping machine;

Figure 10 is a view in horizontal section, taken on the plane indicated by the line 10—10 in Figure 2, and looking in the direction of the arrows; and Figure 11 is a view in vertical section, taken on the vertical plane indicated by the line 11—11 in Figure 10, and looking in the direction of the arrows.

Figure 7:
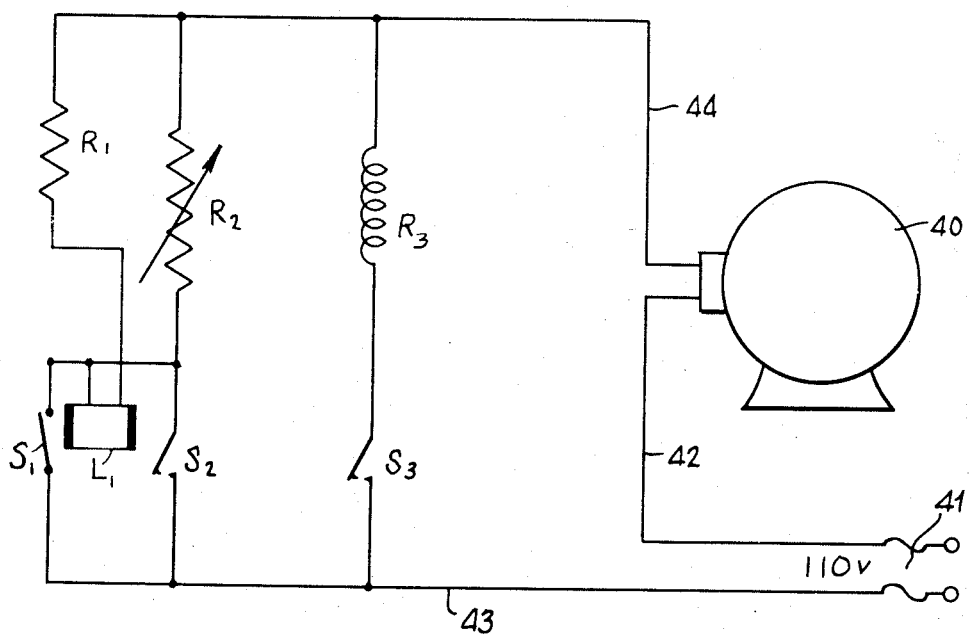
Figure 7 is a diagrammatic view illustrating a control circuit for the drive motor of the whipping machine constructed in accordance with the present invention.

Referring to the above drawings, the whipping machine of the present invention comprises a base frame 10 within which a drive motor 40 is provided, the drive motor being provided with a suitable driving connection (presently to be described) by means of which rotary beaters may be driven. This structure is illustrated in Figure 10 and shown in dotted lines in Figure 1.

Upon the frame 10 a beater chamber or housing 12 is removably secured by means of detents 13 and a depressable latch 14. A rear cover plate 15 is provided to enclose the rear end of the beater chamber 12 and is formed with openings 16 through which beater drive clutches 24 may extend. The beater chamber 12 is formed in the shape of two partial cylindrical portions 17 and 18, respectively, these portions communicating through a longitudinal slot 19 extending throughout the length of the beater chamber 12 and being provided adjacent the front end thereof with an outlet 20. A suitable hopper 21 is carried by the beater chamber 12 and communicates with the cylindrical chambers 17 and 18 in order that ice cream may be fed down into the chambers.

Counter-rotating beaters 22 and 23 are received, respectively, in the cylindrical chambers 17 and 18 and are provided with the aforesaid drive clutches 24. The clutch members 24 engage mating clutch members 47 which are mounted upon parallel shafts 48, journalled in bearings 49 and 50. To facilitate effective centering of the mating members, the clutch members 24 are provided with centering pins 24' which are received within centering recesses 48' in shafts 48. Each of the shafts carries a worm wheel 51 that is engaged and driven by a worm 52 that is driven by the motor 40. As illustrated in Figure 5, the direction of rotation of beater 22 is in opposition to that of beater 23.

The beaters 22 and 23 are each formed with end plates 25 and 26 and, between these end plates beater bars 27 are secured. In addition to the beater bars, spiral vanes 28 and 29, respectively, are provided, the direction of spiral of the vanes 28 being opposite to that of the vanes 29. If desired, the extremities of the vanes may be flexible to achieve an effective wiping action against the interior of the chambers 17 and 18. Stub shafts 30 are formed in the end plates 26 and are adapted to be received within mating recesses formed in an end plate 31 that is secured to the beater chamber or housing 12 in order that it may be closed in its assembled position.

In order that the discharge of soft ice cream from the beater housing may be suitably controlled, a stationary bottom plate 33 is secured to the bottom of the housing 12 and is provided with a slot 34 formed in the bottom thereof. Inasmuch as the outer bottom surface of the housing 12 forms a re-entrant inverted groove, as indicated at 35 in Figure 5, a generally inverted V-shaped channel is provided between the housing 12 and the plate 33 in order that a sliding valve plate 36 may be received therein. This valve is provided with a downwardly extending operating shaft 37 which extends through the slot 34 and enables the valve plate 36 to be slid from the open position illustrated in Figure 4 to a closed position, at which time the outlet 20 is closed by valve plate 36 filling the entire forward portion of the cavity formed between the housing 12 and the bottom plate 33. The forward end of the bottom plate 33 may be provided with a front plate 38 within which a discharge outlet 39 is formed for use where it is desired to extrude the ice cream to form decorative patterns. The valve structure above described thus provides a convenient and effective means for forcing out substantially all of the residue of the whipped soft ice cream that has been carried to the outlet 20, so that it will be discharged. As a result, substantially no residue of a whipped batch of ice cream remains in the machine after its operation has been completed.

In order that the machine may be controlled conveniently so that its whipping operation may be inititated manually and yet not require the constant attention of an attendant, a control circuit has been provided by means of which the whipping operation may be automatically stopped when it has progressed to the completed stage. This circuit is illustrated in Figure 7, wherein the drive motor is shown at 40 as being supplied with power from a suitable source of electricity 41. A lead 42 connects the source 41 with one terminal of the motor 40, return lead 43 being provided and connected as presently described. The other terminal of the motor is connected through a wire 44 to a resistor $R_1$ and a relay coil $L_1$, the latter of which is connected to normally open relay contacts $S_1$ which are also connected to the return lead 43. The resistor $R_1$ is selected to have a high temperature coefficient of resistivity (nickel wire, for example) so that the heat caused by the motor current causes its resistance to increase appreciably during an operating cycle.

Across the coil $L_1$ and resistor $R_1$ is connected a variable resistor $R_2$ and across the contacts $S_1$ a manually operated switch $S_2$ is connected.

A second manually operated switch $S_3$ is connected in series with a resistor or an impedance $R_3$, both being connected across the switch $S_2$ and variable resistor $R_2$.

It has been found that the load on the beater drive motor is a function of ice cream stiffness, being greater for stiff ice cream and less for soft ice cream. During a processing cycle, the load on the beater drive motor falls as the ice cream is softened and reaches a substantially definite value when a given charge of ice cream has been properly whipped, regardless of the initial stiffness of the ice cream. It has also been found that the load on the beater drive motor at the point of optimum whip is a function of the size of the ice cream charge, being slightly higher for larger charges and lower for lesser charges. The time required to properly whip a charge is also a function of the charge size. For example, it has been found that for a given machine and ice cream, 7 seconds of operation are required to properly whip a 4 ounce charge of ice cream whereas 16 seconds are required to properly whip a 12 ounce charge of ice cream.

Utilizing the foregoing information, the circuit illustrated in Figure 7 provides a means by which the device may be shut off automatically when the desired point of optimum whip is reached. Assuming that the motor current existing at the desired point of whip for a 4 ounce charge is 4½ amperes, the circuit is designed for the relay coil $L_1$ to close contacts $S_1$ at motor current values above 4½ amperes and to open contacts $S_1$ at a motor current value of 4½ amperes. This is achieved by properly designing the relay coil $L_1$ to release the contacts at (for example) 2 amperes and setting variable resistor $R_2$ at such a value that the total motor current value is 4½ amperes when the branch current through the relay coil $L_1$ is 2 amperes. If a 4 ounce charge of ice cream is placed in the machine and the switch $S_2$ is closed, the motor will start, resulting in a relatively great current flow through relay coil $L_1$. Since the load on the motor will be relatively high, the relay contacts $S_1$ will close and the motor will continue to operate even though the operator may open switch $S_2$. The motor current will diminish (as the ice cream is softened) until a value of 4½ amperes is reached at which time the branch current through relay coil $L_1$ will be 2 amperes and contacts $S_1$ will open causing the motor to stop. The period of operation is relatively short and maximum motor current low so that the resistor $R_1$ has been heated only a relatively small amount and its temperature and resistance has increased only a small amount. If, on the other hand, a 12 ounce charge of ice cream is placed in the machine, the time required for the motor current to fall is relatively long and maximum current high so that the heating of resistor $R_1$ is relatively great and its temperature and resistance has increased considerably. This causes more of the motor current to be shunted through $R_2$ and proportionally less current through relay coil $L_1$. The motor current will continue to decline (as the ice cream is softened) until the branch current through the relay coil $L_1$ reaches 2 amperes at which time the contacts $S_1$ will open causing the motor to stop. It is evident that the total motor current at the instant when contacts $S_1$ open is greater than 4½ amperes as in the previous case because of the shunting effect produced by the increased resistance of $R_1$. Resistor $R_1$, relay coil $L_1$, and resistor $R_2$ are designed and balanced to produce the same degree of whipping regardless of the size of the ice cream charge.

The point of optimum whip cannot be generally defined, however, as the exact point of most desirable stiffness is largely a matter of personal preference. In order that the operation of this machine may be flexible with regard to the degree of whip, resistor $R^2$ has been made variable. As indicated in the previous example, the machine will consistently and automatically whip ice cream (regardless of quantity or stiffness of charge) to a given stiffness. If the operator so decides, he may change the load under which the machine automatically stops. If resistor $R_2$ is decreased, the total motor current at the instant the contacts $S_1$ open will exceed the values as given in the previous example because current through the resistance $R_2$ will increase. Thus the machine will automatically stop whipping when the load is greater and a stiffer whipped ice cream will result. If resistor $R_2$ is increased, the total motor current at the instant when the contacts $S_1$ open will be decreased and the machine will automatically stop whipping under less total load and a less stiff product will result. In any event, the charge is drawn off by closing the switch $S_3$. The motor current flows through resistance $R_3$ and is thus limited to reduce the speed of the motor during the draw-off period to permit the operator to control the character of the discharge more easily. Moreover, when $S_3$ is first closed, the machine is full of ice cream, and the required motor torque is relatively high. Due to the voltage drop induced by $R_3$, the motor speed is slow permitting easily controlled dispensing. As the product is discharged, the required motor torque reduces with a corresponding reduction in the voltage drop across $R_3$ due to the reduced motor current. As a result, the motor speed increases and, at the end of the cycle, the relatively high speed with consequent greater centrifugal force, causes the product to be effectively discharged from the machine.

It will also be observed that the temperature of $R_1$ will be substantially the same at the start of each run regardless of previous operations. For example, if a large batch of ice cream is beaten, $R_1$ will be relatively warm at the time the unit is shut off. However, it will require a relatively great time to draw off the charge, thus allowing considerable time for $R_1$ to cool. With small batches $R_1$ will be relatively cool at the end of the run so that a relatively short draw-off time will result in only a relatively small added cooling of $R_1$.

The manual switch $S_3$ may be actuated by a yielding push rod 53 which is actuated by the valve plate 36 in such fashion that the switch $S_3$ will be closed when the valve 36 is open. This causes the soft ice cream to be forced through the discharge outlet 39 and the contents of the beater housing to be discharged. Inasmuch as the switch $S_3$ is connected to the line side of relay coil $L_1$, the latter is not energized during this draw-off operation.

Figure 8:
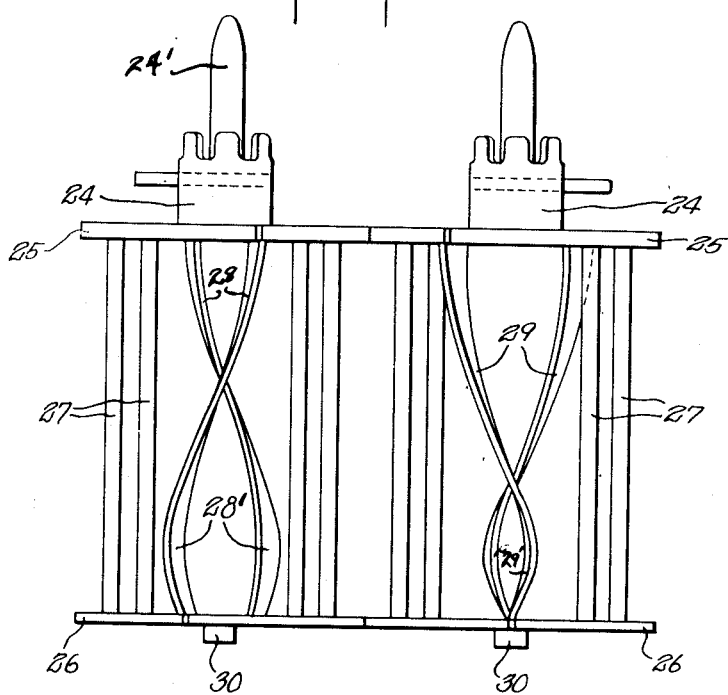
Figure 8 is a plan view showing, in enlarged form, two cooperating beaters of modified form from that illustrated in Figure 3.
Figure 9:
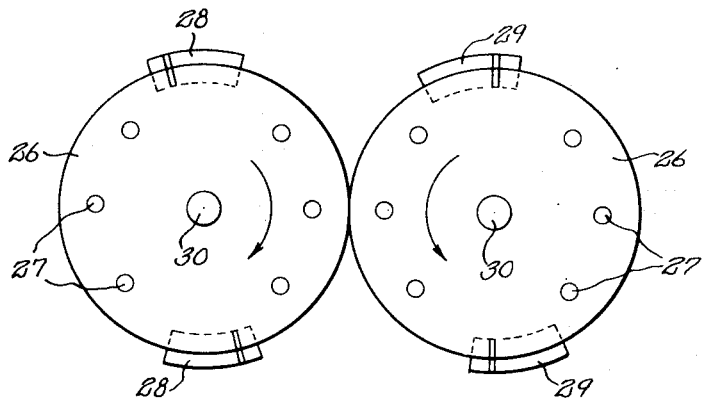
Figure 9 is a view in end elevation of the beaters shown in Figure 8.

Inasmuch as the beaters fit snugly within the chambers 17 and 18, their counter-rotation in addition to whipping and softening the texture of the ice cream, causes the ice cream to be advanced toward the outlet 20, the spiral vanes 28 and 29 producing this action and also scraping clean the surfaces of the beater chambers. In the construction shown, the ice cream in the hopper 21 will be drawn into the whipping zone if the spacing of the beater shafts 24 exceeds 0.75 times the beater diameter and is less than 1.15 times the beater diameter. In Figures 8 and 9, for example, there is shown a structure wherein this ratio is less than unity. Once inside this whipping zone, the ice cream is subject to the violent agitation produced by the action of the beaters as well as to rapid end-to-end turnover because of the effect of the spiral vanes 28 and 29. This uniform and effective whipping operation has been found to produce an excellent flavor and texture in the product.

In the form of beaters shown in Figures 8 and 9, the vanes 28 and 29 are formed with reentrant portions 28' and 29', respectively. These portions serve effectively to clean the beater chambers from both directions toward the outlet 20, thus insuring complete cleaning of the chambers.

From the foregoing it will be seen that a beater mechanism has been provided by means of which a proper degree of whipping or beating of the ice cream may be automatically accomplished without the necessity of close supervision by an attendant. Moreover, the structure is simple to construct and assemble and disassemble, thus facilitating the cleaning of the mechanism and effective maintenance thereof. In addition, the structure insures substantially no contamination of the ice cream by virtue of residual ice cream remaining from a previously softened or whipped batch.

While the invention has been described with specific reference to the accompanying drawings, it is not to be limited save as defined in the appended claims.

We claim:

1. Beater mechanism, comprising a housing having inside wall means forming at least two intersecting chambers of circular cross section, the axes of which are spaced apart by a distance which is less than the sum of the respective radii of the chambers, said chambers communicating along a plane of intersection, a feed hopper on the housing, a plurality of beaters, means to journal the beaters in the housing in adjacent relationship with at least one beater in each chamber, said beaters having beater bar means defining upon rotation a figure of revolution of substantially the same size and shape as the chambers in which they are respectively mounted, said beater bar means thereby being adapted to move closely adjacent substantially all of the said inside wall means defining the chambers, means to rotate the beaters, and an outlet in the housing at the plane of intersection of the chambers and communicating with the beaters in both chambers to discharge beaten material from the housing, whereby the housing may be substantially completely emptied of beaten material through the outlet by the beaters.

2. Beater mechanism, comprising a housing having formed therein at least two laterally intersecting cylindrical chambers, the axes of which are spaced apart by a distance less than the sum of the respective radii, said chambers being in communication along a plane of intersection, a feed hopper on the housing, a plurality of beaters mounted at least one in each of said chambers, said beaters having outside diameters closely approximating the inside diameters of the respective chambers along the entire length thereof, means to journal the beaters in the housing in adjacent relationship, means to rotate the beaters in opposite directions of rotation, and an outlet in the housing at the plane of intersection of the chambers and communicating with the beaters in both chambers to discharge beaten material from the housing, whereby the housing may be substantially completely emptied of beaten material through the outlet by the beaters.

3. Beater mechanism, comprising a housing, a feed hopper on the housing, a plurality of beaters, means to journal the beaters in the housing in laterally adjacent relationship, means to rotate the beaters, said beaters each comprising a pair of coaxial, disc-shaped end pieces spaced apart along the axis of beater rotation, a plurality of beater bars arrayed circumferentially about the axis of rotation and joining the end pieces, an outlet opening in the housing and communicating with the beaters between the end pieces to discharge beaten material from the housing, and vane means carried by the end pieces for moving the material towards said opening.

4. Beater mechanism adapted to be rotated about an axis and being free of radial and axial structural members on the axis of rotation, comprising a centerless cage formed of a pair of coaxial disc-shaped end pieces spaced apart along an axis, a plurality of beater bars arrayed circumferentially about the axis parallel thereto and joining the end pieces, and a plurality of vanes joining the end pieces, said vanes being curved to present a leading edge which is substantially radial with respect to the axis and successive points of which are circumferentially spaced with respect to the end pieces in one direction from a point adjacent one end piece to a point intermediate of the end pieces, the leading edge between said point and the second end piece having successive points circumferentially spaced with respect to the end pieces in the opposite direction, whereby rotation of said beater causes said vanes to move material from both end pieces in opposite directions toward said point.

5. Beater mechanism, comprising a housing, a feed hopper on the housing, a plurality of beaters, means to journal the beaters in the housing in adjacent relationship, a plurality of beater bars of circular cross-section on each of the beaters, all of the beater bars of a given beater being disposed parallel to and spaced from the axis of rotation of the beater, substantially flat spiral vanes formed on the beaters to cause material to be advanced toward an outlet, said vanes being formed with surfaces inclined to force the material being beaten from the ends of the housing toward the center thereof, means to rotate the beaters, and an outlet in the housing and communicating with the beaters to discharge beaten material from the housing, said outlet being disposed intermediately of the ends of the housing and in cooperative relationship with the spiral vanes of the beaters.

6. Beater mechanism, comprising a housing having wall means forming at least two laterally intersecting chambers, a feed hopper on the housing, a plurality of beaters, means to journal the beaters in the chambers of the housing in adjacent relationship, a plurality of beater bars on each of the beaters, said beater bars being substantially parallel to the axes of rotation of the respective beaters and disposed closely adjacent the walls defining the chambers, the spacing of the beater shafts axes center to center being greater than 0.75 times the sum of the beater radii and less than 1.15 times the sum of the beater radii.

7. Beater mechanism, comprising a housing formed with two laterally intersecting, cylindrical chambers having parallel axes, said housing including wall means forming a substantially V-shaped groove adjacent the junction of the two circular chambers and parallel to the axes thereof, said groove being disposed externally of the chambers, a feed hopper on the housing, a plurality of beaters, means to journal the beaters in the housing in adjacent relationship, means to rotate the beaters, an outlet in the housing and communicating with the beaters to discharge beaten material from the housing, the outlet communicating with both chambers and being formed in the said wall means defining the V-shaped groove, and a valve of substantially V-shaped section mounted slidably in the V-shaped groove of the housing adjacent the outlet.

8. In beater mechanism for accommodating materials of different hardness and in different quantities, comprising a housing, a feed hopper on the housing, beater mechanism in the housing, an electrical motor for rotating the beater mechanism, said motor drawing current in direct proportion to the load thereon, an outlet in the housing to discharge beaten material from the housing, the improvement comprising a circuit for energizing the motor, a relay having normally open contacts in the circuit, said relay being adapted to hold the contacts closed for all values above a predetermined current flow therethrough, and a manually operated switch in the circuit and connected across the relay contacts, whereby said motor may be made to operate for a random period of time necessary to achieve the pre-established softness in the beaten material.

9. Beater mechanism, comprising a housing, a feed hopper on the housing, beater mechanism in the housing, a motor for rotating the beater mechanism, an outlet in the housing to discharge beaten material from the housing, a valve for closing the outlet, a circuit for energizing the motor, and a switch in the circuit and actuated upon opening movement of the valve for closing the motor circuit.

10. In beater mechanism for accommodating materials of different hardness and in different quantities, comprising a housing, a feed hopper on the housing, beater mechanism in the housing, an electrical motor for rotating the beater mechanism, said motor drawing current in direct proportion to the load thereon, an outlet in the housing to discharge beaten material from the housing, the improvement comprising a circuit for energizing the motor, a relay having normally open contacts in the circuit, said relay being adapted to hold the contacts closed for all values above a predetermined current flow therethrough, a manually operated switch in the circuit and connected across the relay contacts, a valve for closing the outlet, and a switch in the circuit and actuated upon movement of the valve for closing the motor circuit, whereby said motor may be made to operate for a random period of time necessary to achieve the preestablished softness in the beaten material.

11. In beater mechanism for accommodating materials of different hardness and in different quantities, comprising a housing, a feed hopper on the housing, beater mechanism in the housing, an electrical motor for rotating the beater mechanism, said motor drawing current in direct proportion to the load thereon, an outlet in the housing to discharge beaten material from the housing, the improvement comprising a circuit for energizing the motor, a relay having normally open contacts in the circuit, said relay being adapted to hold the contacts closed for all values above a predetermined current flow therethrough, a manually operated switch in the circuit and connected across the relay contacts, a first resistance element having a high temperature coefficient of resistivity in series with the relay, and a second resistance element connected across the first resistance element and relay, whereby said motor may be made to operate for a random period of time necessary to achieve the preestablished softness in the beaten material.

12. Beater mechanism, comprising a housing, a feed hopper on the housing, beater mechanism in the housing, a motor for rotating the beater mechanism, an outlet in the housing to discharge beaten material from the housing, a valve for closing the outlet, a circuit for energizing the motor, a switch in the circuit and actuated upon movement of the valve for closing the motor circuit, and an impedance in series with the last named switch.

13. In beater mechanism for accommodating materials of different hardness and in different quantities, comprising a housing, a feed hopper on the housing, beater mechanism in the housing, an electrical motor for rotating the beater mechanism, said motor drawing current in direct proportion to the load thereon, an outlet in the housing to discharge beaten material from the housing, the improvement comprising a circuit for energizing the motor, a relay having normally open contacts in the circuit, said relay being adapted to hold the contacts closed for all values above a predetermined current flow therethrough, a manually operated switch in the circuit and connected across the relay contacts, a resistance element having a high temperature coefficient of resistivity in series with the relay, a second resistance connected across the first resistance and relay and in series with the manually operated switch, a valve for closing the outlet, a switch in the circuit actuated upon movement of the valve for closing the motor circuit, and an impedance in series with the last named switch, whereby said motor may be made to operate for a random period of time necessary to achieve the preestablished softness in the beaten material.

14. Beater mechanism as set forth in claim 4, the leading edge of said vanes extending radially outwardly with respect to said axis beyond the periphery of said disc-shaped end pieces to develop upon rotation of the vanes a figure of revolution the diameter of which exceeds the diameter of the end pieces.

15. The mechanism as set forth in claim 7, including a plate member bridging said groove to overlie said valve and said outlet and contained in a plane substantially parallel to the axes of the chambers, said groove and plate member affording a passageway for the beaten material, whereby the beaten material may be forced from the outlet into the groove in directions substantially radially of the beater axes to engage the said plate member to be forced outwardly in a direction of discharge parallel to the axes of the beaters, and whereby the sliding of said valve in the groove to close the outlet forces the beaten material in the groove outwardly in the direction of discharge.

16. In beater mechanism as set forth in claim 15, the forward edge of said valve being inclined, and an orifice plate disposed at the forward edge of said plate member.

17. In beater mechanism as set forth in claim 11, said resistance element being formed of nickel.

NEWTON E. SPIESS, Jr.
EDWARD M. GROPEN.
KENNETH R. WEAVER.

References Cited in the file of this patent
UNITED STATES PATENTS

| Number | Name | Date |
|---|---|---|
| 1,005,767 | Bickerstaff | Oct. 10, 1911 |
| 1,498,286 | Marsh | June 17, 1924 |
| 1,500,061 | Dimm | June 1, 1924 |
| 1,825,261 | Burns et al. | Sept. 29, 1931 |
| 1,858,796 | Wilcoxsen | May 17, 1932 |
| 1,987,258 | Kinzey | Jan. 8, 1935 |
| 2,027,185 | Loomis | Jan. 7, 1936 |
| 2,052,569 | Jensen | Sept. 1, 1936 |
| 2,071,410 | Kuhn et al. | Feb. 23, 1937 |
| 2,498,237 | Baymond | Feb. 21, 1950 |